United States Patent [19]
Bowden et al.

[11] Patent Number: 6,021,876
[45] Date of Patent: Feb. 8, 2000

[54] ELECTRICAL PROPORTIONAL PRESSURE CONTROL VALVE

[75] Inventors: Charles J. Bowden, Battle Creek; Timothy P. Lamie, Portage, both of Mich.

[73] Assignee: Fema Corporation of Michigan, Portage, Mich.

[21] Appl. No.: 09/129,798

[22] Filed: Aug. 6, 1998

[51] Int. Cl.[7] .................................................. F15B 13/07
[52] U.S. Cl. .............................. 192/12 C; 137/625.61; 137/625.64
[58] Field of Search ..................... 137/625.61, 625.64; 192/12 C

[56] References Cited

U.S. PATENT DOCUMENTS

| | | | |
|---|---|---|---|
| 2,767,689 | 10/1956 | Moog, Jr. . | |
| 2,931,389 | 4/1960 | Moog et al. | 137/625.62 |
| 2,964,059 | 12/1960 | Geyer | 137/625.62 |
| 3,095,906 | 7/1963 | Kolm | 137/625.62 |
| 3,410,308 | 11/1968 | Moog et al. | 137/625.62 |
| 3,757,822 | 9/1973 | Kell | 137/625.61 |
| 5,240,041 | 8/1993 | Garnjost | 137/625.64 X |

*Primary Examiner*—Gerald A. Michalsky
*Attorney, Agent, or Firm*—Flynn, Thiel, Boutell & Tanis, P.C.

[57] ABSTRACT

A pressure control valve having an electric first stage pilot with a single pilot outlet port and providing a variable pressurized hydraulic fluid to the pilot outlet port and at a pressure that is proportional to an electric input signal variable between first and second values. A second stage hydraulic valve is provided which has a valve body with a spool reciprocally movable in a bore. A first end of the bore is coupled to the aforesaid pilot outlet port. A spring abutment is provided in the bore at a second end remote from the first end, and a spring is oriented between and abuts the spring abutment and one end of the spool remote from the pilot outlet port for urging the spool to oppose the pressurized hydraulic fluid at the pilot outlet port.

10 Claims, 8 Drawing Sheets

ELECTRICAL PROPORTIONAL PRESSURE CONTROL VALVE

FIELD OF THE INVENTION

This invention relates to a two stage pressure control valve and, more particularly, to a single coil pilot operated two stage pressure control valve having a shiftable spool with two control surfaces influenced by pressure in the control ports of the valve to maintain the spool balanced in every position thereof against the pilot pressure in a pilot outlet port.

BACKGROUND OF THE INVENTION

This invention arose out of a need to control the power take-off shaft on a farm tractor. However the disclosure is not to be limited to this environment as the two stage pressure control valve is adapted for many other uses, such as any use where a motive force is to be discontinued for a period of time and during this time another function is to be activated.

It is often important to control the rate at which the power take-off shaft on a farm tractor is engaged and disengaged because machinery that is driven by the power take-off shaft has great mass. Accelerating and decelerating the mass without gradual control of the various components is essential. In the past, the farmer needed to have experience in timing the engagement of the power take-off shaft as well as the disengagement and braking thereof. This manual control often times resulted in the controlled machinery being decelerated too rapidly causing component failure on the machinery or resulted in rapid acceleration also causing component failure. Accordingly, it is a desire to provide a mechanism for controlling the engagement as well as the disengagement and braking of the power take-off shaft in a fully automated manner.

Accordingly, it is an object of the invention to provide a pressure control valve having two control ports, wherein the first control port is initially at a high pressure while the second control port is at a low pressure and thence effecting a systematic control so as to cause the first control port to be changed to a lower pressure condition thereafter followed by an increase of the pressure at the second control port to a high pressure and vice versa.

It is a further object of the invention to provide a reciprocal spool in the pressure control valve, the spool having a pair of opposing control surfaces such that pressure in the first and second control ports is systematically applied to the control surfaces so as to control the position of the spool to improve valve performance, such as repeatability of control functions and pressure sensitivity.

It is a further object of the invention to provide a pressure control valve that is manufactured as a unit and is capable of being installed as a unit into a valve housing without any alteration of the piping leading to the valve housing.

It is a further object of the invention to provide a pressure control valve having two control ports, with each control port being controlled by a separate spool reciprocally mounted in the valve body.

It is a further object of the invention to provide a pressure control valve, as aforesaid, which is controlled by a first stage pilot which has a single solenoid coil and produces a pressure output at a pilot outlet port that is proportional to the electrical signal value applied thereto.

It is a further object of the invention to provide a pressure control valve, as aforesaid, wherein movement of the spool caused by the pilot pressure at the pilot outlet port is resisted by a bias spring, and wherein pressure in the respective control ports is systematically applied to the spools in opposite directions so that, in conjunction with the spring load, the spool is balanced in every position against an equivalent pilot load pressure at the pilot outlet port.

SUMMARY OF THE INVENTION

The objects and purposes of the invention are met by providing a pressure control valve having an electric first stage pilot with an outlet port and providing a variable pressurized hydraulic fluid to the outlet port and at a pressure that is proportional to an electric input signal variable between first and second values. A second stage hydraulic valve is provided which has a valve body with a bore extending therein and a spool reciprocally movable in the bore. A first end of the bore is coupled to the aforesaid outlet port of the electric first stage pilot. A spring abutment is provided in the bore at a second end remote from the first end, and a spring is oriented between and abuts the spring abutment and one end of the spool remote from the pilot outlet port for urging the spool to oppose the pressurized hydraulic fluid at the aforesaid pilot outlet port. The second stage additionally includes a pair of supply ports on and spaced along the valve body and supplying a continuous high pressure hydraulic fluid to the supply ports. First and second operative valves interposed between the supply ports and the spool are provided for separately controlling a magnitude of a pressure of the supply of pressurized hydraulic fluid to oppositely axially facing first and second control surfaces on the spool. The first and second operative valves are configured to supply pressurized hydraulic fluid to only one of the first and second control surfaces at a time so that the pressurized hydraulic fluid adds to or subtracts from a force of the spring abutting the end of the spool remote from the pilot outlet port to facilitate a balancing of the spool against an equivalent pressurized hydraulic fluid at the aforesaid pilot outlet port in every position of the spool.

BRIEF DESCRIPTION OF THE DRAWINGS

Other objects and purposes of this invention will be apparent to persons acquainted with apparatus of this general type upon reading the following specification and inspecting the accompanying drawings, in which.

DETAILED DESCRIPTION

Figure 1:
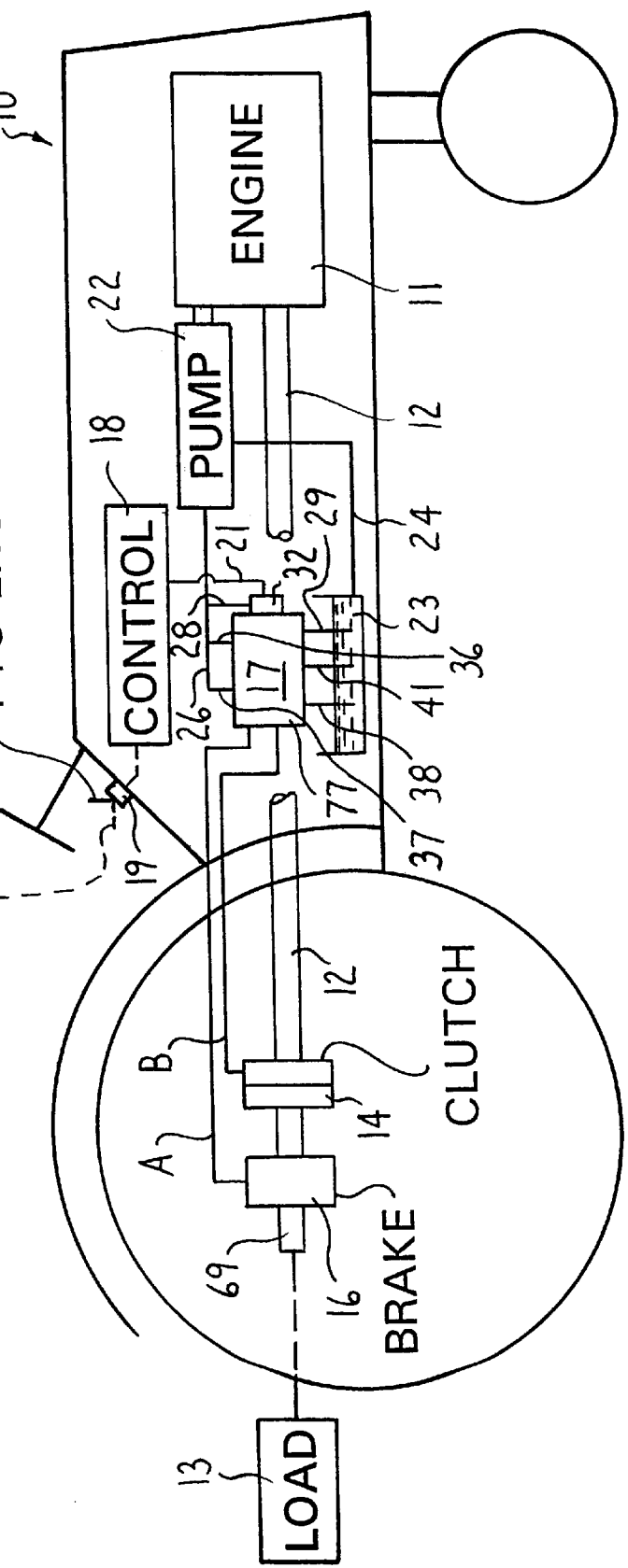
FIG. 1 is a schematic illustration of a farm tractor having thereon the pressure control valve embodying the invention.

Certain terminology will be used in the following description for convenience in reference only and will not be limiting. The words "up", "down", "right" and "left" will designate directions in the drawings to which reference is made. The words "in" and "out" will refer to directions toward and away from, respectively, the geometric center of the device and designated parts thereof. Such terminology will include derivatives and words of similar import.

Figure 2:
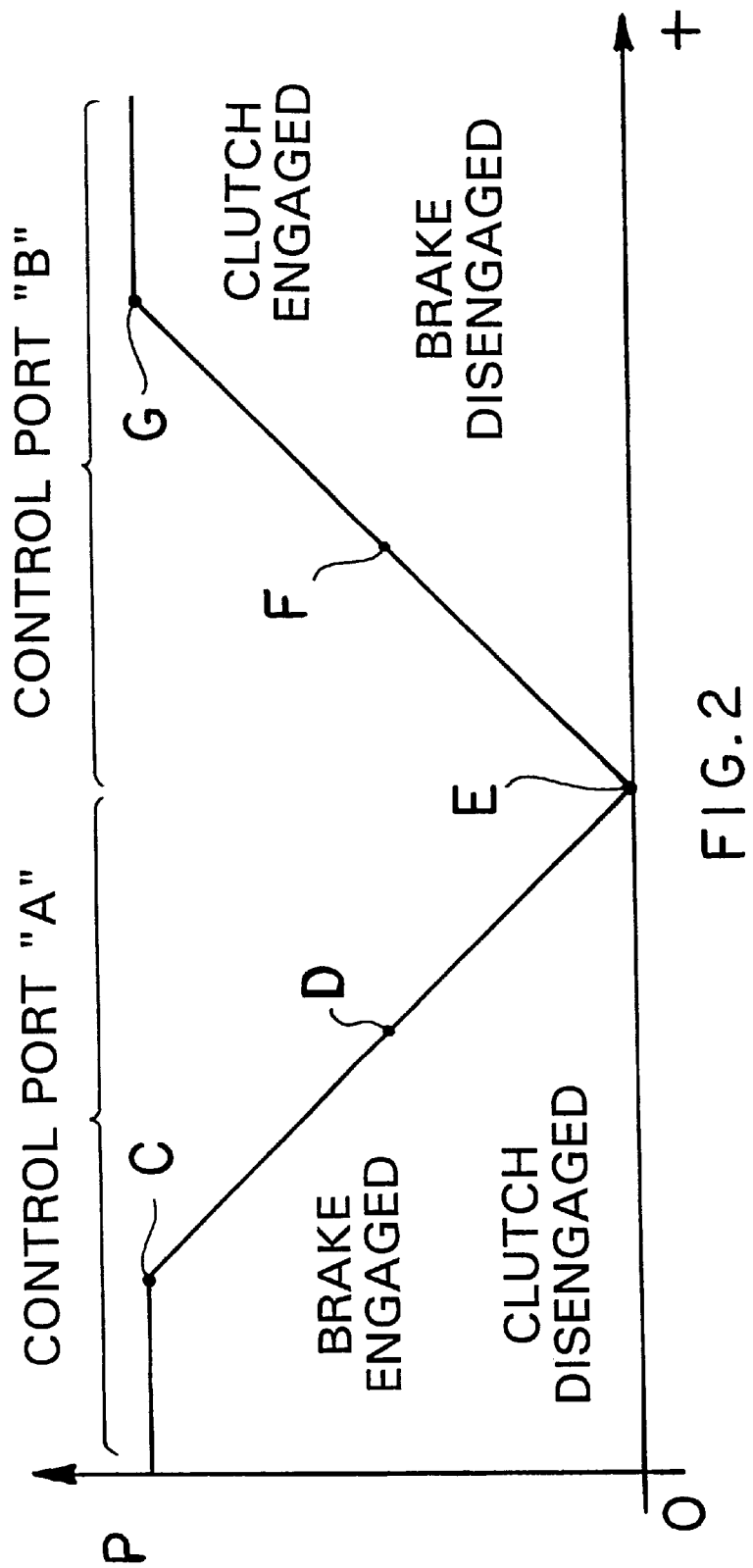
FIG. 2 is a graph illustrating the performance characteristics of the inventive pressure control valve.

FIG. 1 illustrates only one of many environments for the inventive pressure control valve, and this disclosure is not to be limited thereto. More specifically, a farm tractor 10 has thereon the usual engine 11 driving a power take-off shaft 12 and thence a load 13 through a hydraulically actuable clutch 14 and brake 16. As is customary, in order to drive the load, it is necessary to effect a sequential operation of the brake so that it becomes disengaged followed thereafter by an engagement of the clutch. A pressure control valve 17 embodying the invention is provided for effecting an automated sequential operation of the clutch 14 and the brake 16. A logic control 18 is provided for controlling the sequential operation of the pressure control valve 17 in response to an activation of a switch 19 that can be toggled between, for example, two positions to effect a control of the pressure control valve 17 in response to the characteristics determined by the logic control 18. The output characteristics of the logic control 18 are illustrated in FIG. 2 and are represented by the horizontal line of the graph. The logic control 18 can effect an advancement of an electrical signal produced at the output 21 thereof at any desired rate from a low signal at the left end of the graph to a high signal at the right end of the graph. Once the switch 19 has been toggled from one position to the other, the logic control 18 will effect an advancement of the electrical signal along the horizontal line of the graph illustrated in FIG. 2 at a specified rate preprogrammed into the logic control 18.

The engine 11 also drives a pump 22 drawing hydraulic fluid from a reservoir 23 through an intake line 24 and delivering it at a sufficient capacity to maintain sufficient operating pressure at all times via a supply line 26 to various ports on the pressure control valve 17 to be described in more detail below. The pressure control valve 17 has two outlet ports identified as "A" and "B" connected, respectively to the hydraulically actuable brake 16 and clutch 14.

Figure 3:
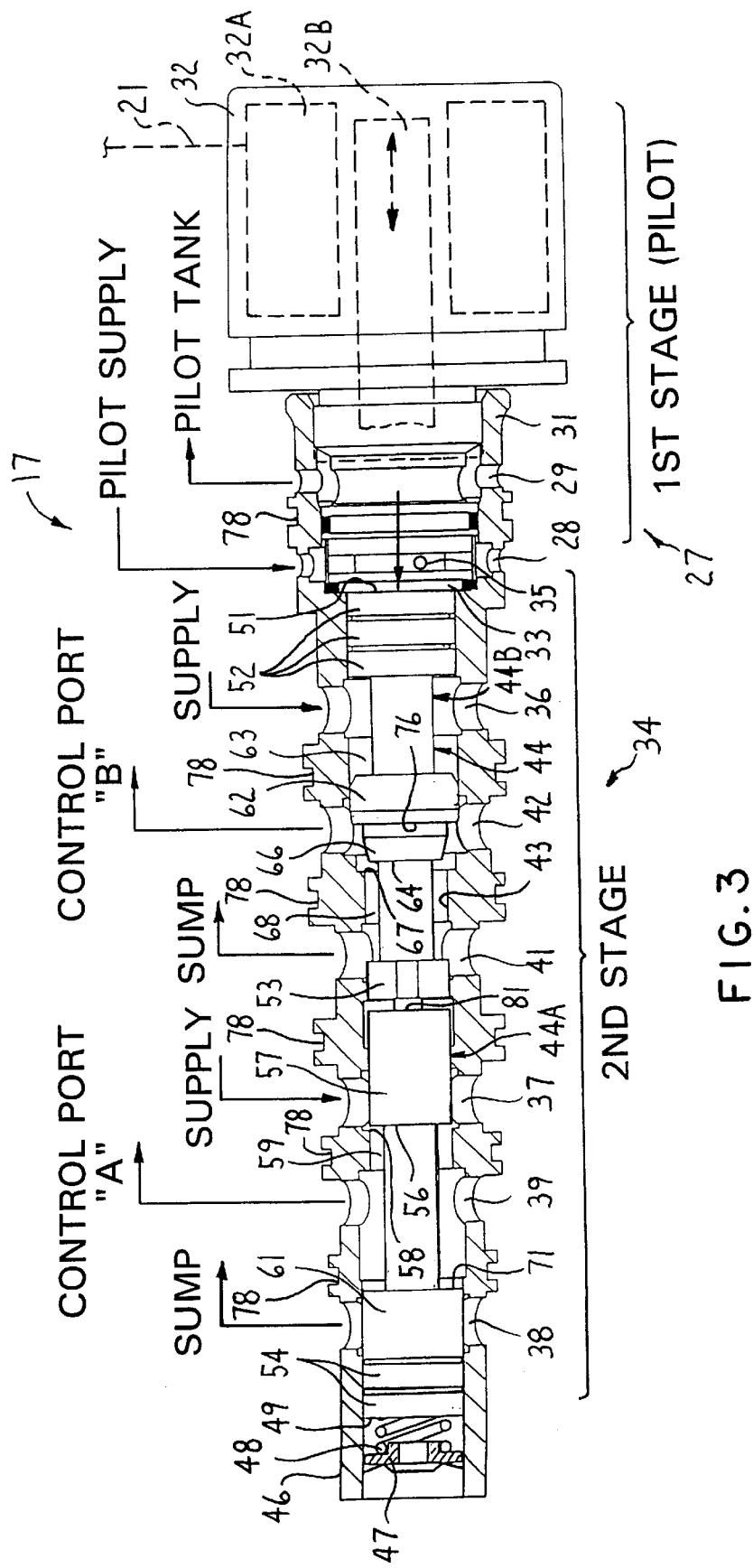
FIG. 3 is a central longitudinal sectional view through the first and second stages of the pressure control valve embodying the invention, the spool in the second stage of the valve being biased to the right.

Referring now to FIG. 3 illustrating the inventive pressure control valve 17, the pressure control valve 17 is comprised of two stages, namely, a first stage and a second stage. The first stage is a pilot valve which can be of any design which can generate a hydraulic pressure, at a varying rate, from a high to low value or a low to high value, by varying an electric input signal to it. Generally, there are three basic types of first stage pilots, namely, (1) a normally open type in which the pilot starts out with a low hydraulic pressure, with no electric input signal applied thereto, and increases in pressure, in a proportional manner, as the electrical signal is applied; (2) a normally closed type in which the pilot starts out with a high hydraulic pressure, without an electric signal applied thereto, and decreases in pressure, in a proportional manner, as the electrical signal is applied; and (3) a two-way type wherein the pilot starts out with a medium hydraulic pressure with no electrical input signal applied thereto, decreases in pressure, in a proportional manner when the electrical input signal is applied in one direction and increases in pressure, in a proportional manner when the input signal is reversed. For the following disclosure, the first stage pilot will be treated as the normally open type.

The first stage pilot valve is generally illustrated at 27 in FIG. 3. It has a pilot supply port 28 receiving hydraulic fluid from the supply line 26 and a pilot tank port 29, which is connected to the reservoir 23, in the body 31 of the valve 17. An electric servomotor 32 is provided for controlling the pressure applied to a pilot outlet port 33. The servomotor 32 has a single coil 32A and a reciprocal spring returned armature 32B, the stroke of the armature 32B being proportional to the magnitude of the electric signal applied to the coil 32A. In the normally open position of the pilot valve 27, the pilot supply port 28 is connected to the pilot outlet port 33 via an orifice 35 while the pilot outlet port 33 is connected directly to the pilot tank port 29. As an electrical signal applied to the servomotor 32 is increased from a low value toward a high value, the connection of the pilot outlet port 33 to the pilot tank port 29 is reduced in proportion to the amount that the electrical signal to the servomotor 32 is increased until the pilot outlet port 33 is disconnected from the pilot tank port 29 so that the pressure in the pilot outlet port 33 is increased to a high value via the orifice connection 35 with pilot supply port 28.

The second stage of the pressure control valve 17 is indicated generally as at 34 in FIG. 3. The valve body 31 of the second stage 34 is axially elongate and includes a pair of supply ports 36 and 37 spaced axially along the length thereof and received hydraulic fluid from the supply line 26. To the left of the supply port 37 illustrated in FIG. 3, there is provided a sump port 38 and a control port 39. Intermediate the supply ports 36 and 37, there is provided a further sump port 41 and a further control port 42. Each of the four described ports 36–39 and 41, 42 are connected to the hollow interior 43 of the valve body 31. The sump ports 38 and 41 are connected to the reservoir.

A spool 44 having two separate parts 44A and 44B is reciprocally supported in the hollow interior 43 of the valve body 31. The end 46 of the valve body 31 remote from the pilot outlet port 33 includes an abutment member 47 fixedly disposed in the interior 43 of the valve body 31. A compression spring 48 is provided between the abutment member 47 and the left end 49 of the spool part 44A. The right end 51 of the spool part 44B is exposed to the pilot outlet port 33. As a result, the pressure developed at the pilot outlet port 33 opposes the spring force of the compression spring 48 due to the left end of the spool part 44B abutting the right end of the spool part 44A as at 81.

Turning now to the construction of the spool 44, the spool 44 is reciprocally supported in the interior 43 of the valve body 31 by a plurality of lands 52, 53 and 54.

Each of the lands 52, 53 and 54 are coaxially oriented with respect to each other in this particular embodiment.

In this particular embodiment, the control port 39 is oriented intermediate the sump port 38 and the supply port 37. A left edge 56 of a land 57 on the spool 44 is initially spaced from a right edge 58 of a passageway 59 so as to define an opening through which pressurized hydraulic fluid can flow from the supply port 37 to the control port 39 through the passageway 59. The control port 39 is initially blocked from a connection to the sump port 38 by a land 61 on the spool 44.

Similarly, the control port 42 is oriented intermediate the supply port 36 and the sump port 41. Initially, the control port 42 is not connected to the supply port 36 by reason of the land 62 on the spool 44 blocking the passageway 63 interconnecting the control port 42 to the supply port 36. However, a left edge 64 of a further land 66 on the spool 44 is initially spaced from a right edge 67 of a further passageway 68 so that an opening is provided between the control port 42 and the sump port 41 through the passageway 68.

Figure 8:
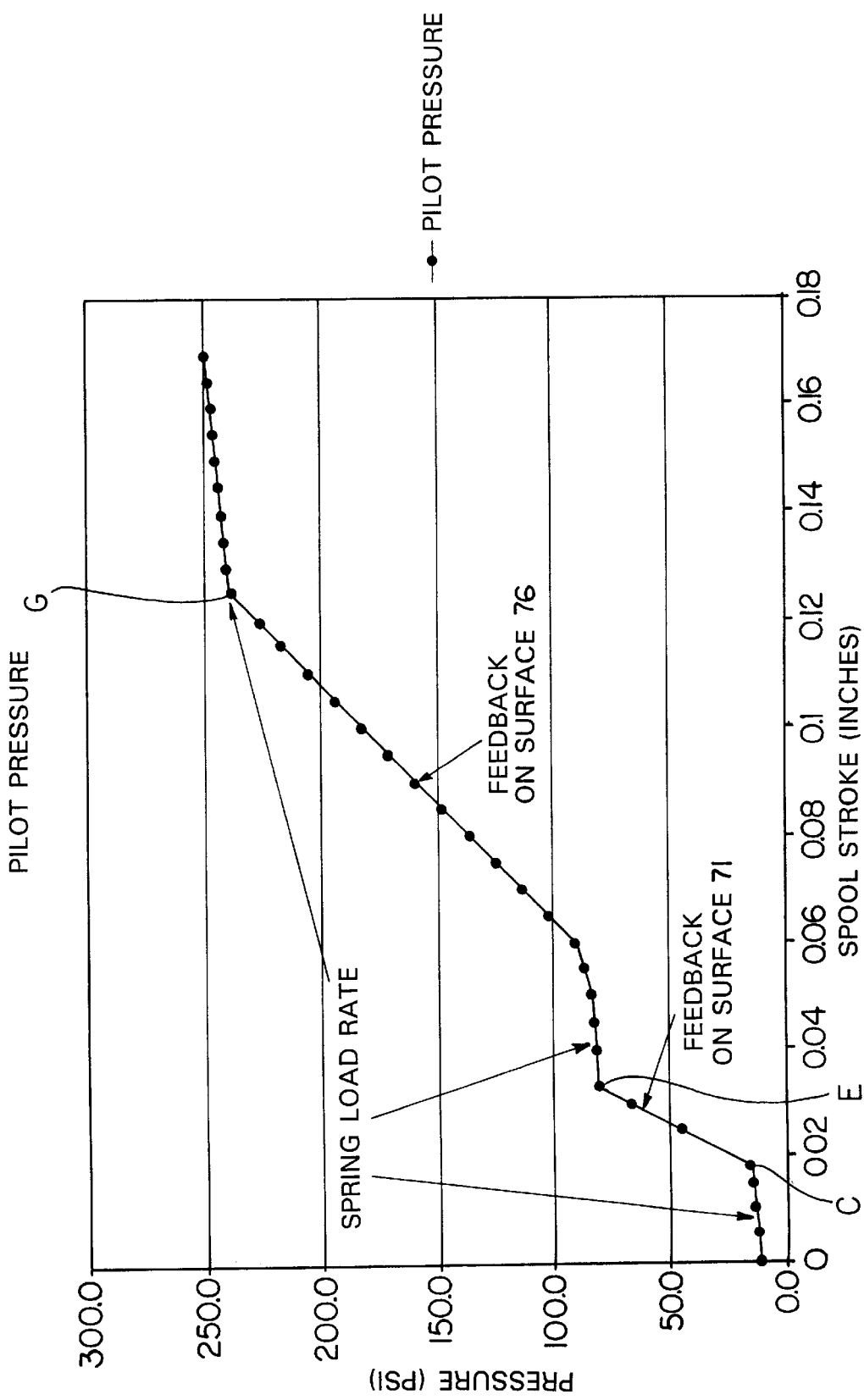
FIG. 8 is a graph showing the relationship of the pilot pressure at the pilot outlet port to the stroke of the spool caused thereby.

As has been noted in FIG. 3, the control port 39 has also been referred to as the control port "A" and the control port 42 has also been referred to as the control port "B". As is illustrated in FIGS. 1 and 2, the letters "A" and "B"

correspond to the ports that control, respectively, engagement and disengagement of the brake 16 and engagement and disengagement of the clutch 14. When no electrical signal is applied to the servomotor 32, the spool is shifted to its rightmost position in FIG. 3 and, as a result, high pressure is applied to the control port "A" to effect an engagement of the brake while simultaneously therewith a low pressure is applied to control port "B" so that the clutch 14 is disengaged. As a result, the power take-off shaft 12 can continue to be rotated by the engine 11 while the drive shaft 69 connected to the load 13 is braked. Referring to FIG. 8, the spool 44 is, in this position, at the "zero" stroke position.

In the position of the pressure control valve 17 illustrated in FIG. 3, a high pressure is applied to a rightwardly facing control surface 71 on the land 61 of the spool 44 to offset the force of the compression spring 48 so that the pressure on the control surface 71 in conjunction with the force of the compression spring 48 will balance the spool in a given position against an equivalent pilot load pressure at the pilot outlet port 33. For purposes of this and the following discussion, the pressure applied to the control surface 71 will be referred to as a "feedback pressure" which subtracts from the force of the compression spring 48. The feedback pressure provision facilitates an improvement in the performance of the pressure control valve 17, particularly as to repeatability of performance and sensitivity to pressure.

Figure 4:
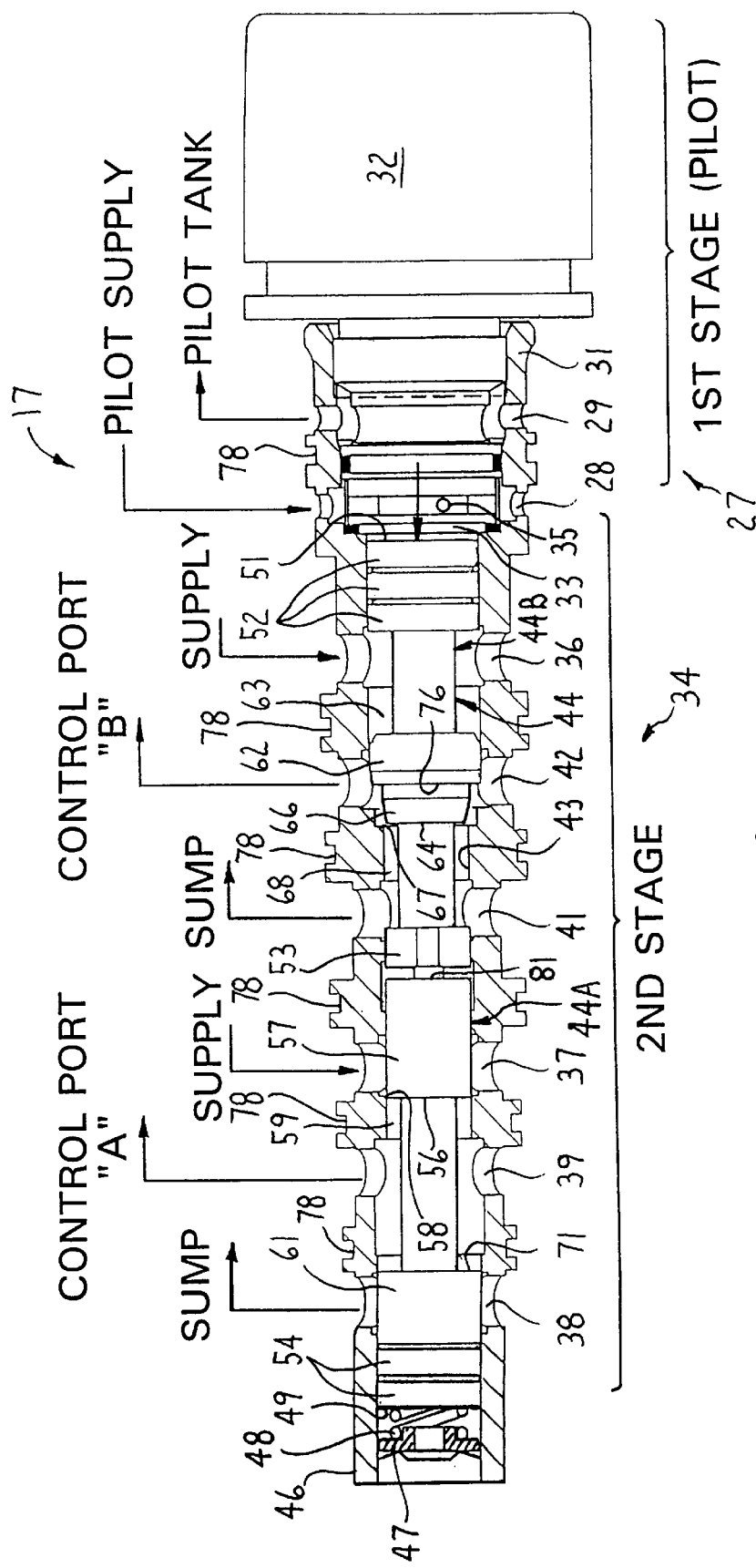
FIGS. 4–7 are views similar to FIG. 3, but with the spool in the second stage of the control valve being shifted in each figure incrementally to the left so that FIG. 7 illustrates the spool in the leftmost position.
Figure 5:
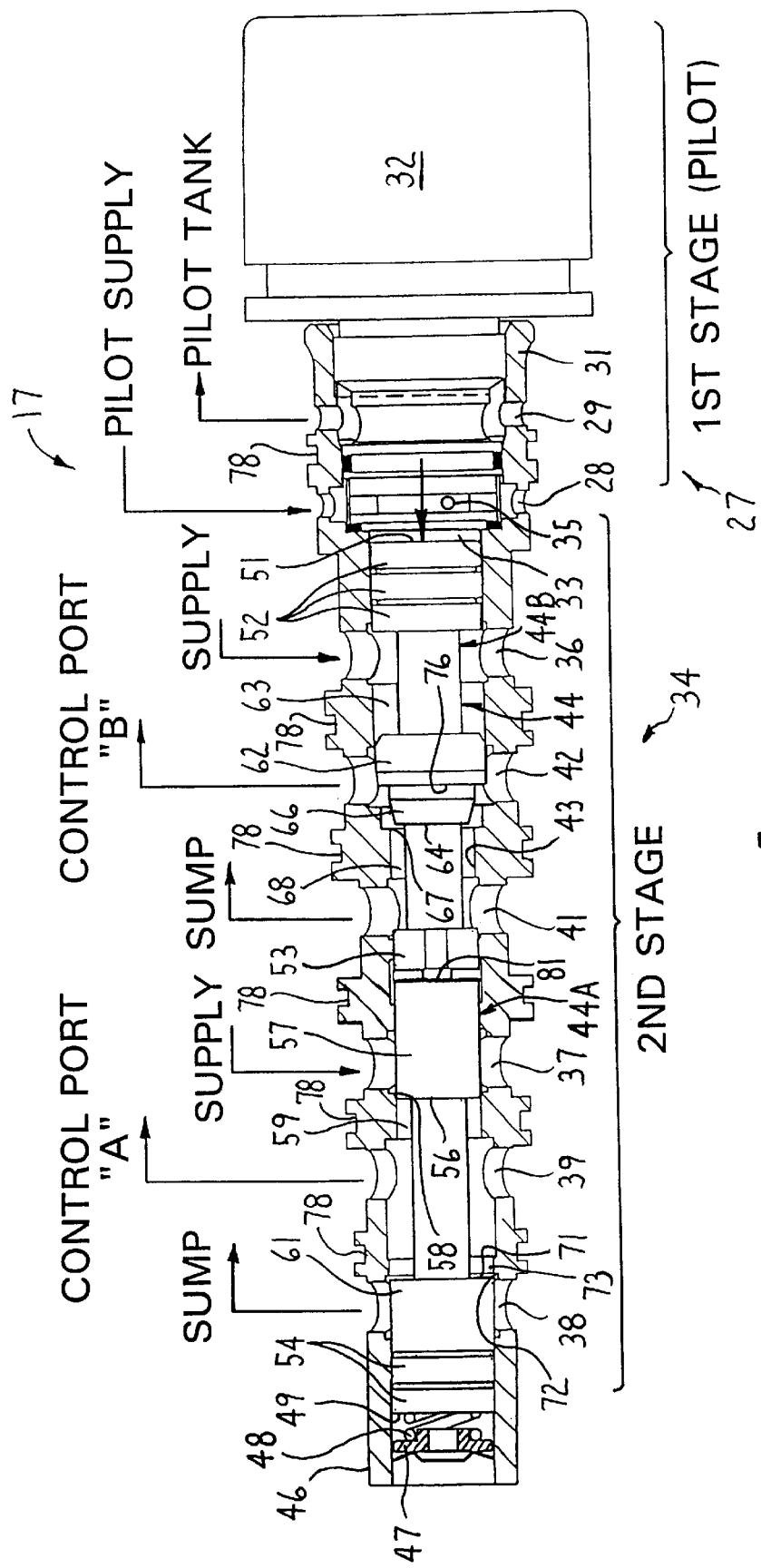

When it is desired to unbrake the drive shaft 69, the farmer need only activate the switch 19 from the PTO disengaged position to the PTO engaged position so that the logic control 18 will effect an increase in the signal to the single coil 32A from a low value toward a high value at a controlled rate. As a result, the servomotor 32 will operate to vary the hydraulic pressure delivered to the pilot outlet port 33 to vary the pressure applied to the right end 51 of the spool 44. FIG. 8 illustrates at spool position "C" the point "C" in FIG. 2 at which the pressure at control port A begins to decrease to start the disengagement of the clutch. FIG. 4 illustrates the position corresponding to position "D" illustrated in FIG. 2 whereas FIG. 5 illustrates the position corresponding to position "E" wherein the pressure to both of the control ports "A" (39) and "B" (42) are at a low pressure thereby placing the brake and the clutch in a neutral condition. The neutral condition occurs when the stroke of the spool 44 is at "E" in FIG. 8. More specifically, the land 61 is spaced from a left edge 72 (FIG. 5) of a passageway 73 so that an opening is provided between the control port 39 and the sump port 38 to cause the pressure in the control port "A" (39) to reduce to a low value. Similarly, the land 66 is still spaced from the left edge 64 of the passageway 68 so that a connection is provided between the control port 42 and the sump port 41 to continue to maintain the pressure in the control port "B" (42) at a low value.

Figure 6:
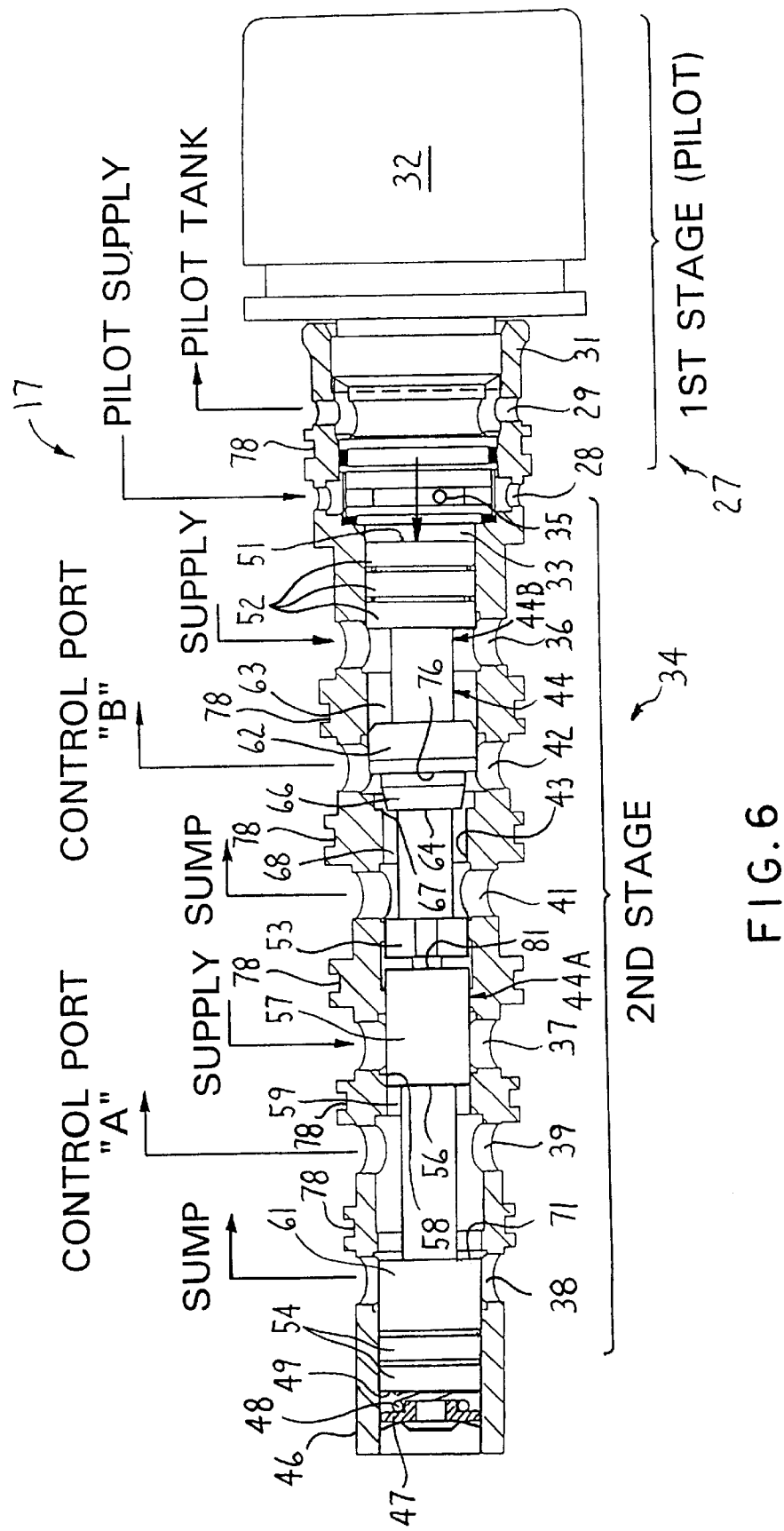
Figure 7:
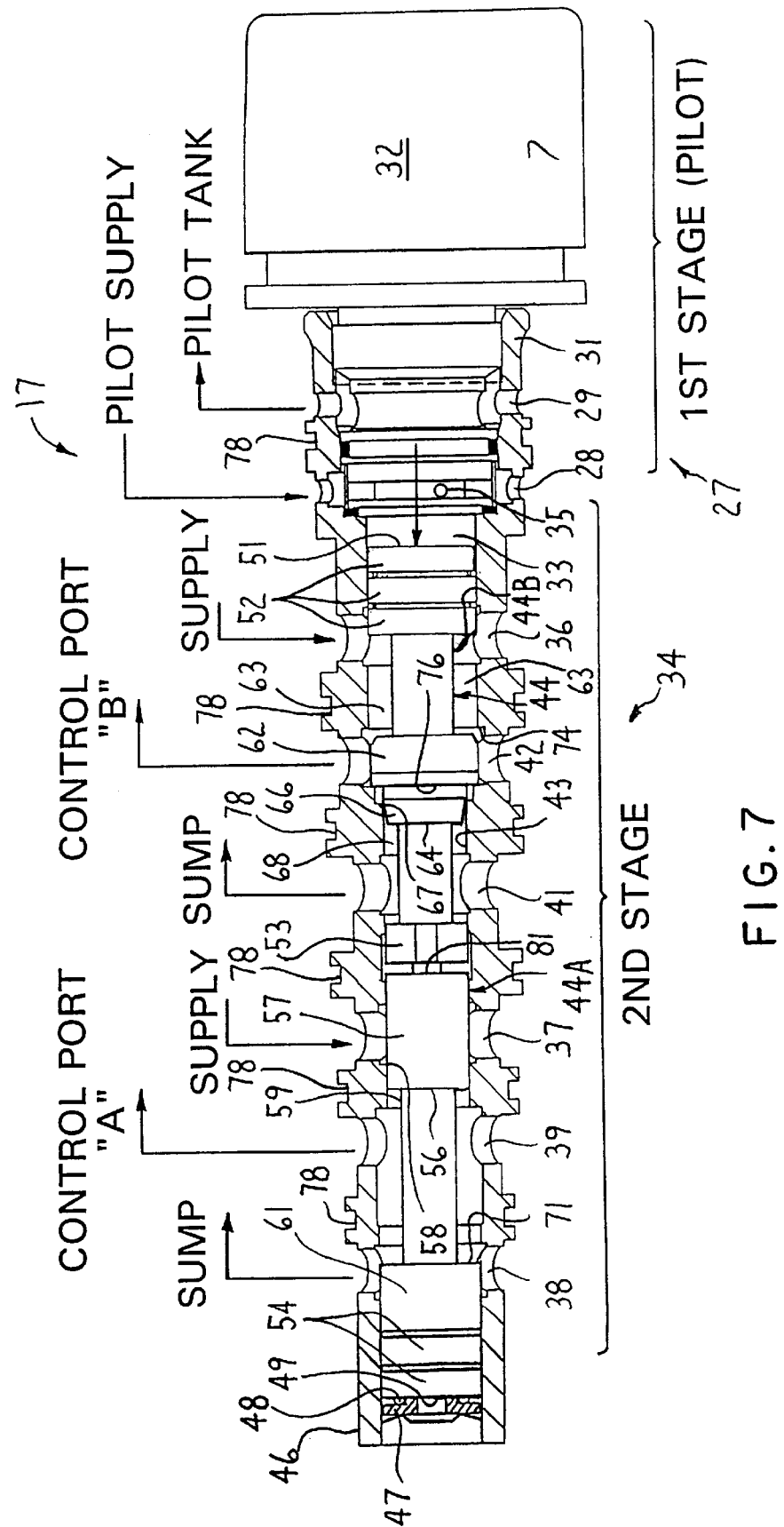

Continued advancement of the electrical signal to the servomotor 32 (to the right in FIG. 2) will continue the advancement of the spool 44 to the left whereat FIG. 6 corresponds to position "F" illustrated in FIG. 2 and FIG. 7 corresponds to the clutch being fully engaged and the brake being fully disengaged at position "G". In this position, the land 66 will close off the opening between the control port 42 and the sump port 41 so that the pressure in the control port "B" (42) will be opened through the passageway 63 to the supply port 36 by reason of the land 62 being spaced from a left edge 74 (FIG. 7) of the passageway 63. As a result, the pressure in the control port "B" (42) will be high corresponding to a fully engaged clutch 14.

During the aforesaid transition, it will be noted that the feedback pressure applied to the control surface 71 has been reduced to a low value by reason of a low pressure existing in the control port "A" (39). As the land 66 begins to engage the edge 67 of the passageway 68, the connection of the control port "B" (42) to the sump port 41 will be more and more restricted thereby building up pressure in the control port "B" (42). As a result, an increased pressure will be applied to a further leftward facing control surface 76 provided on the land 62, which feedback pressure effects an additive force to the compression spring 48, namely, a force added to the force in the right direction caused by the spring 48. This feedback pressure remains at a high pressure until the spool 44 nears its leftmost position illustrated in FIG. 7. At the FIG. 7 position corresponding to position "G" in FIGS. 2 and 8, the land 62 abuts the right end of the passageway 68 so that the pressure acting on the surface 76 drops to a low value due to the connection thereof solely to the sump port 41.

It is to be noted that the feedback pressures applied to the respective control surfaces 71 and 76 are, when activated, added to or subtracted from the force of the spring 48 and such pressures never cause a load that is greater than the load generated by the spring 48 except when the spool 44 approaches the FIG. 7 position. As has been stated above, these feedback pressures simply balance the spool in every position thereof against an equivalent pilot load pressure provided at the pilot outlet port 33.

Since, as has been stated above, there exists three types of first stage pilots, the above description pertains to the normally open type. When the first stage pilot is a normally closed type, the initial position of the spool will be in the FIG. 7 position. The connections of the brake and clutch to the valve 17 will need to be reversed. If a two-way type first stage pilot is utilized, the initial position of the valve will be in the FIG. 5 position corresponding to position D in FIG. 2. As a result, increases in the electrical input signal to the servomotor 32 will cause the spool to shift to the left toward the FIG. 7 position to effect a fully engaged clutch and a fully disengaged brake. A decrease in the electric signal will cause the spool to transition between the FIG. 5 position through the FIG. 4 position (position C in FIG. 2) to the FIG. 3 position wherein a fully engaged brake exists and a fully disengaged clutch exists.

As illustrated in FIG. 1, the pressure control valve 17 includes a valve housing 77 having an opening (not shown) therein which is adapted to receive therein the valve body 31, the valve housing 77 having various chambers coupled to the respective pump supply line 26, sump connections 29, 38 and 41 coupled to the reservoir 23 and the control lines "A" and "B" coupled to the brake and the clutch. As a result, if something should happen to the valve construction 17 illustrated in FIG. 3, for example, such that it no longer works as intended, it can be simply removed from the valve housing 77 and replaced with a replacement unit. The piping to the valve housing 77 does not need to be affected by this change. Plural axially spaced O-ring receiving grooves 78 are provided on the valve body 31 to effect by an O-ring in each thereof a sealing engagement with the valve housing to facilitate operative separation of the various chambers in the valve housing from one another unless otherwise connected to one another by operation of the spool 44 or spool parts 44A and 44B.

Although particular preferred embodiments of the pilot operated, electro-hydraulic, three position/four-way, proportional pressure control valve have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

We claim:

1. A two stage pressure control valve, comprising:

an electric first stage pilot consisting of a single coil operated servomotor, said first stage pilot further having a pilot supply port, a pilot tank port and a single outlet port, Pressurized hydraulic fluid being provided to said pilot supply port, said first stage pilot further including means for regulating the flow of hydraulic fluid from said outlet port to said pilot tank port to thereby provide a variable pressurized hydraulic fluid to said outlet port and at a pressure that is proportional to an electric input signal applied to said single coil and which is variable between first and second values;

a second stage hydraulic valve having a valve body with a bore extending therein and a spool reciprocally movable in said bore, a first end of said bore being coupled to said outlet port of said electric first stage pilot;

a spring abutment in said bore only at a second end remote from said first end, a spring oriented between and abutting said spring abutment and an end of said spool remote from said outlet port on said first stage pilot and urging said spool to oppose said pressurized hydraulic fluid at said first stage outlet port;

said second stage further including a pair of supply ports on and spaced along said valve body and supplying a continuous high pressure hydraulic fluid to said supply ports; and first and second operative valve means interposed between said supply ports and said spool for separately controlling a magnitude of a pressure of the supply of pressurized hydraulic fluid to opposite axially facing first and second control surfaces on said spool, said first and second operative valve means being configured to supply pressurized hydraulic fluid to only one of said first and second control surfaces at a time so that said pressurized hydraulic fluid adds to or subtracts from a force of said spring abutting said end of said spool remote from said outlet port to facilitate a balancing of said spool against an equivalent pressurized hydraulic fluid at said first stage outlet port in every position of said spool.

2. The two stage pressure control valve according to claim 1, wherein said second stage includes a pair of control ports spaced along said valve body, each said control port opening into a region of said spool whereat respective said first and second control surfaces on said spool are located so that said first and second operative valve means effect a connection of said supply ports to said control ports and an outputting of pressurized hydraulic fluid that is present at each respective said first and second surfaces to a load connected to said control port.

3. The two stage pressure control valve according to claim 2, wherein said second stage further includes a pair of sump ports spaced along said valve body and supplying a constant low pressure exhaust for said pressurized hydraulic fluid;

wherein said sump ports are each on a side of a respective one of said control ports remote from a respective said supply port; and wherein said second stage further includes third and fourth operative valve means interposed between said sump ports and said spool for separately connecting said control ports to said sump ports to facilitate said balancing of said spool against an equivalent pressurized hydraulic fluid at said first stage outlet port in every position of said spool.

4. The two stage pressure control valve according to claim 1, wherein separate loads are connected to respective said control ports.

5. The two stage pressure control valve according to claim 4, wherein a respective one of said loads, which is connected to one control port is a hydraulically operated clutch having an input shaft and an output shaft which operatively controls motive force from a power take-off shaft of a motor to said output shaft of said clutch; and wherein a respective other of said loads connected to an other of said control ports is a hydraulically operated brake for effecting a braking of an output shaft from said clutch.

6. The two stage pressure control valve according to claim 5, wherein said power take-off shaft and said motor are mounted on a chassis of a wheel supported vehicle, said motor effecting a driving of said output shaft through said sower take-off shaft, said input shaft, and said clutch which are connected in series.

7. The two stage pressure control valve according to claim 1, wherein said spool consists of at least first and second axially aligned spool parts; and wherein said first and second control surfaces are each on differing spool parts.

8. The two stage pressure control valve according to claim 7, wherein said second stage includes a pair of control ports spaced along said valve body, each said control port opening into a region of said spool whereat respective said first and second control surfaces on respective said first and second spool parts are located so that said first and second operative valve means effect a connection of said supply ports to said control ports and an outputting of pressurized hydraulic fluid that is present at each respective said first and second surfaces to a load connected to said control port.

9. The two stage pressure control valve according to claim 8, wherein said second stage further includes a pair of sump ports spaced along said valve body and supplying a constant low pressure exhaust for said pressurized hydraulic fluid;

wherein said sump ports are each on a side of a respective one of said control ports remote from a respective said supply port; and wherein said second stage further includes third and fourth operative valve means interposed between said sump ports and respective said first and second spool parts for separately connecting said control ports to said sump ports to facilitate said balancing of said spool against an equivalent pressurized hydraulic fluid at said first stage outlet port in every position of said spool.

10. The two stage pressure control valve according to claim 9, wherein separate loads are connected to respective said control ports.

* * * * *